Figure 1:
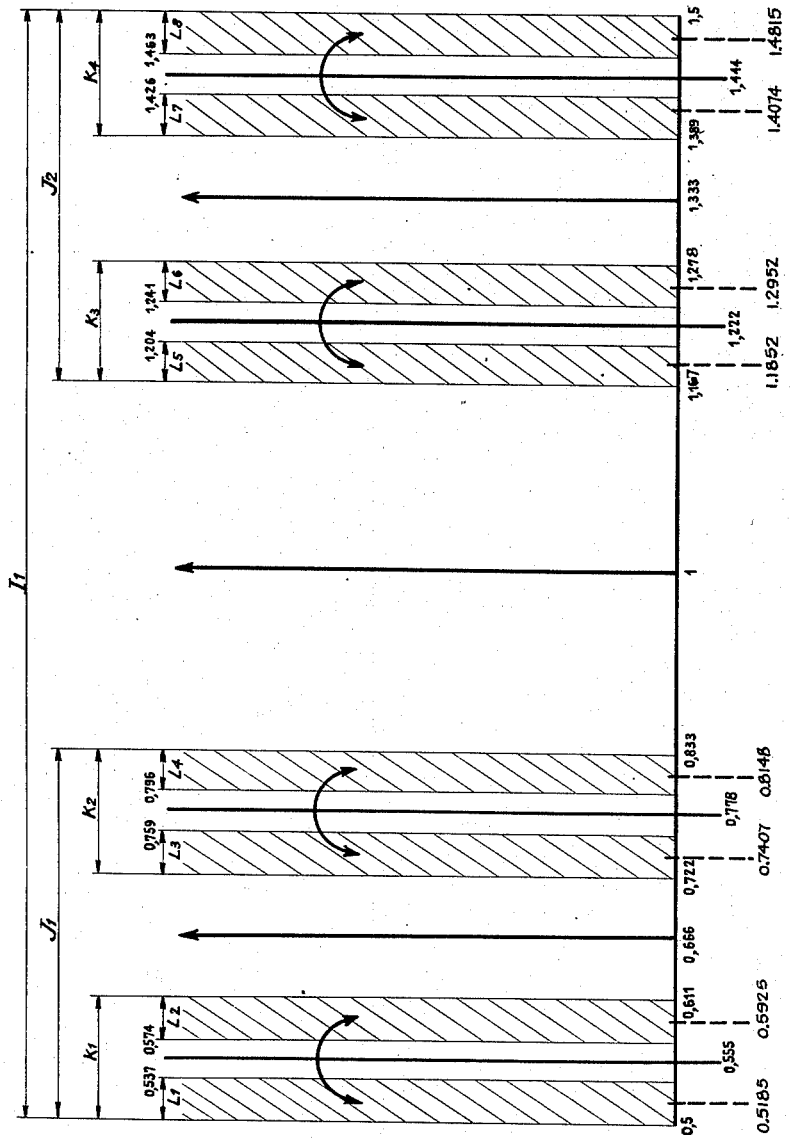

Patented Nov. 21, 1950

2,530,839

UNITED STATES PATENT OFFICE 2,530,839

APPARATUS FOR THE MEASUREMENT OF THE INDEX NUMBER OF TELEGRAPH SIGNALS

Joseph Pernic and Robert Leroy, Paris, France, assignors to Compagnie Generale d'Electricite, Paris, France, a corporation of France Application August 4, 1947, Serial No. 765,850
In France May 13, 1946

1 Claim. (Cl. 178—69)

This invention relates to measuring the indices of a bivalent rhythmic telegraphic modulation, to facilitate the correction of transmitted signals and thus reduce their distortion, and it has for its object to provide a novel and improved means for accomplishing this purpose.

Various other objects and advantages will be apparent as the nature of the invention is more fully disclosed.

It is known that the index number of a telegraphic modulation is a numerical parameter which permits characterizing clearly and without ambiguity any telegraphic modulation, that is to characterize the succession of successive signals which constitute said modulation.

The advantage of knowing the index number of a telegraphic modulation resides in the fact that the characteristic distortion given to a signal by a transmission channel depends on the succession of previous signals; it is therefore useful, in order to apply precorrection procedures, to be able to determine this succession by a number (known as the index number) which changes in value at the beginning of each received signal, said value depending upon the succession of the polarities of a certain number of signals which have preceded said received signal. In a number of practical instances it is, however, only the absolute value of the index which it is useful to know. The index number of modulation, at the moment when a given signal is received, is called "restricted" if one considers, for its calculation or measurement, a finite, determined and constant number of signals prior to the given signal; and it is called "integral" if one considers, for its calculation or measurement, a total number, constantly increasing, of signals which have preceded the given signal.

The Comite Consultatif International Telegraphique (C. C. I. T.) gave, in Recommendation No. 313 of the Reports of its meeting at Brussels (published at Berne by the Bureau of the International Union of Telecommunications), a definition of this index number.

This modulation is the following:

Let there be a telegraphic two-pole modulation constituted by a succession of signals of equal duration, these signals capable of having a certain polarity or the opposite polarity. It can be said, by definition, that each signal may have either the value +1, or the value −1, and it will be designated by $a_0, a_1, a_2, \ldots a_h \ldots$ the succession of values of the successive signals $a_0$ corresponding to the last signal received and $a_1 \ldots a_h \ldots$ to the preceding signals in the order of increasing seniority.

The restricted index number, limited to the $h$ signals received before the signal $a_0$ is then:

(1) $$i_h = a_0 + \frac{a_1}{2} + \frac{a_2}{2^2} + \cdots + \frac{a_h}{2^h}$$

and the integral index number corresponding to the indefinite succession of signals received before element $a_0$ is:

(1') $$i = a_0 + \sum_{k=1}^{\infty} \frac{a_k}{2^k}$$

These indices, bringing to the denominator the successive powers of two, shall be hereinafter designated by the name of indices of base 2.

The use of such numbers presents, however, a serious shortcoming: in point of fact, to one and the same integral index number given may correspond two different modulations. For instance, the index number 0 corresponds to two indefinite successions (S₁) $a_0 = +1$ $a_1 = a_2 = \ldots = a_k \ldots = -1$
(S₂) $a_0 = -1$ $a_1 = a_2 = \ldots = a_k \ldots = +1$ The result is that, if one and the same limited modulation of any kind is caused to follow $S_1$ and $S_2$, the integral indices corresponding to them will take the same value although the restricted indices corresponding to this limited modulation are the same.

From the measure of the integral indices it is therefore not possible to deduce the value of the restricted indices, the knowledge of which is most useful for the application of the precorrection processes.

On the other hand, the measurement of the restricted indices requires a much more complicated apparatus than that which is used for measuring the integral indices.

The present invention has for its object to provide a device which, in combination with a known device for measuring integral indices, permits obtaining restricted index numbers.

Such a device depends upon the utilization of index numbers of base $m$, $m$ being greater than 2, and not base 2 indices as in the preceding definition.

To define an index of base $m$, it is sufficient to substitute, in the equations of definition (1) and (1') number $m > 2$, which gives:

(2) $$i_{h,m} = a_0 + \frac{a_1}{m} + \frac{a_2}{m^2} + \cdots + \frac{a_h}{m^h}$$

(2') $$i_{\infty, m} = a_0 + \sum_{k=1}^{\infty} \frac{a_k}{m^k}$$

The limit values of these index numbers are the extreme values of the integral index numbers, that is:

$$\pm\left(1+\sum_{k=1}^{\infty}\frac{1}{m^k}\right)=\frac{m}{m-1}$$

An infinity of integral indices the values of which are included in the following limits may correspond to the restricted index $i_{hm}$:

$$i'_{\infty m}=i_{hm}-\sum_{k=h+1}^{\infty}\frac{1}{m^k}=i_{h,m}-\frac{1}{m^h}\frac{1}{m-1}$$

$$i''_{\infty m}=1_{h,m}+\sum_{k=h+1}^{\infty}\frac{1}{m^k}=i_{h,m}+\frac{1}{m^h}\frac{1}{m-1}$$

If the index number signs are abstracted, that is if it is supposed in the succession $a_0=1$ (the measurement of indices of opposed values offers no difficulty; however, the absolute value of the index is what is to be considered in view of the precorrection) the index numbers are limited by $$1-\frac{1}{m-1}\quad\text{and}\quad 1+\frac{1}{m-1}$$

The base $m$ integral index may therefore be obtained by replacing in the second number of (2) quantity $a_h$, the absolute value of which is equal to $\pm 1$, by a quantity $b_h$, of the same sign as $a_h$ and limited below in absolute value by $$1-\frac{1}{m-1}=\frac{m-2}{m-1}$$

whatever be $h$.

The existence of this lower limit shows that the sites where the values of the integral indices and restricted indices of higher order than $h$ are separated by the values of the restricted indices of order $h$, otherwise stated that the knowledge of the integral index permits determining all the restricted indices without ambiguity or that the knowledge of a restricted index of a certain order permits determining all the restricted indices of a lower order relating to the same modulation. To the measurement of a restricted index that of an index of a higher order or of an integral index may therefore be substituted.

Figure 2:
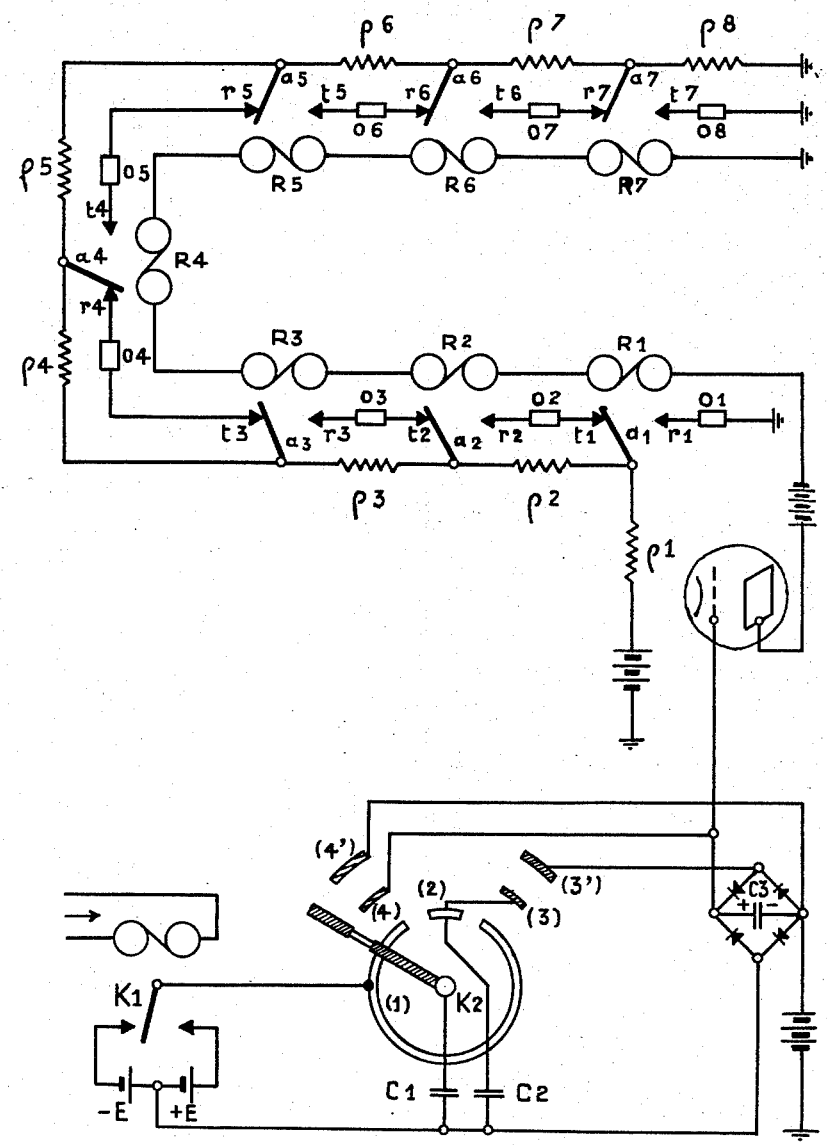

The invention will be described in connection with the accompanying drawings, wherein:

Fig. 1 is a diagram showing the distribution of the restricted indices with reference to the integral indices; and Fig. 2 is circuit diagram of an electrical system embodying the invention.

Referring first to Fig. 1, the method of determining the successive restricted indices and base $m$ integral indices will be shown.

The (positive) indices are included in the interval $I_1$ limited by values $$1-\frac{1}{m-1}\quad\text{and}\quad 1+\frac{1}{m-1}$$

which are those of the extreme integral indices.

The center of this interval corresponds to value 1, and represents the restricted index of order zero. The median segment, centered on the middle point, representing fraction $$p=\frac{m-2}{m}$$

of interval $I_1$ must be excluded from this interval; the points of division correspond to integral indices and, in the excluded region, there is no other index than that of order zero.

The same procedure is followed in the two retained intervals $J_1$ and $J_2$: the points of division give the integral indices, the two excluded central regions containing only indices of order 1, represented by center points of $J_1$ and $J_2$.

All the restricted indices of higher order and the integral indices belong to the extreme regions $K_1$, $K_2$, $K_3$, $K_4$ on which it is possible to operate in the same manner, and so on indefinitely. The points of separation always give integral indices, the centers of the zones the restricted indices of increasing order.

The segments excluded by the successive operations corresponding to the following fractions of the initial interval:

$$p\quad p(1-p)\quad p(1-p)^2\ \ldots\ p(1-p)^k\ \ldots$$

and their total length tends toward that of interval $I_1$ if $k$ increases indefinitely.

The result of the expression of the separation to be revealed is that there is interest, for a given value of $h$, to select for $m$ the value giving the maximum separation to be revealed, that is the root higher than 2 of:

$$(m-1)(m-2)-\frac{1}{h}m=0$$

Thus for $h=2$, the optimum value is 2.78, for $h=3$, it is 2.55.

In this latter case, the minimum distance to be revealed is about $$\frac{4.2}{100}$$

which is still realizable.

By way of non-limitative example we are going to state accurately the application of the process in the case of indices of order 2 and 3. Although not optima, base 3 shall be adopted to simplify the example.

In this case, the initial interval $I_1$ has for limits $$\frac{1}{2}$$

and $$\frac{3}{2}$$

and is equal to 1; we have $$\frac{m-2}{m}=\frac{1}{3}$$

we exclude from $I_1$ a central part equal to $$\frac{1}{3}$$

of this interval which contains only restricted index 1 of order zero; the points of separation are integral indices. The same operation is performed on the retained regions $J_1$, $J_2$, the centers of which are restricted indices of order 1, $$\frac{2}{3}$$

and $$\frac{4}{3}$$

We thus obtain four sites $K_1$, $K_2$, $K_3$, $K_4$ centered upon the restricted indices of order 2, and the limits of which are integral indices. The integral indices obtained by indefinitely continuing the operation constitute the triadic combination of Cantor. The table below gives the value of the restricted indices of order 2, the corresponding limits of integral or restricted indices of an order higher than 2, as well as the values of the indices of restricted order 1 and 0 which separates them.

| Modulations | Indices of the order of 2 | Limits of Corresponding Integral Indices | | Separating restricted indices of the order of 0 and 1 | |
|---|---|---|---|---|---|
| I: + + + | 1.444 | 1.389 | 1.5 | | |
| | | | | 1.333 | (1) |
| II: + + − | 1.222 | 1.167 | 1.278 | | |
| | | | | 1 | (0) |
| III: + − + | 0.778 | 0.722 | 0.833 | | |
| | | | | 0.666 | (1) |
| IV: + − − | 0.555 | 0.5 | 0.611 | | |

Fig. 1 shows, furthermore, the eight sites $L_1$ to $L_8$ where there are found the integral indices or higher order ones corresponding to the various restricted indices of order 2 and the centers of which are the restricted indices of order 3.

It is seen that in order to discriminate the restricted indices of order 2, three devices are needed, the state of which varies according to whether the voltage registering the integral index is, respectively, lower or higher than 0.666, 1, 1.333, the admissable operating tolerance being $$\frac{1}{9}$$

for the extreme values (thus, the device appertaining to the separating value 0.666 must undergo its change of state, to invert if it is a relay, between 0.611 and 0.722), and $$\frac{1}{3}$$

for the central value.

To discriminate the restricted indices of order 3, seven devices are necessary to locate the measured value of the integral index with reference to the values: 0.555, 0.666, 0.777, 1, 1.222, 1.333, 1.444.

The separations to be revealed are $$\frac{1}{27}$$

for the four devices governing the characteristic values of indices of order 2, of $$\frac{1}{9}$$

for the two devices governing the characteristic values of indices of order 1, and $$\frac{1}{3}$$

for the devices governing the value of the index of order zero.

The device according to the invention, which permits determining the $h+1$, last elements of a telegraphic modulation, consists of the combination of an apparatus of known type for the registration of the integral index number or of the measured index number starting from the beginning of the modulation, and a discriminator with $(2^h-1)$, the state of which devices varies according to whether the measured integral index is lower or higher than one of the $(2^h-1)$ restricted indices of order $k$ lower than $h$, the separation to be revealed being $$2\frac{m-2}{m-1}\frac{1}{m^k+1}$$

It is thus possible to register the value of the restricted index of order $h$. Fig. 2 represents, by way of example, an embodiment of such a device.

In Fig. 2, K1 is a recording relay, the coil of which is connected to the incoming line of the telegraphic current and the armature of which engages a contact connected to a positive source $+E$ or a contact connected to a negative source $-E$ according to the polarity of the signals received on the line; K2 is a rotary switch turning at the rate of one turn during the life of a signal, and carrying a brush, a long conductor sector (1) attached to the armature of K1 and a short conductor sector (2). The brush of K2 is connected at the common point to sources $-E$ and $+E$ by means of a condenser C1, and short sector (2) is connected at this same common point by means of a condenser C2.

Switch K2 has, besides, two pairs of contacts 3, 3' and 4, 4'. The contacts 3, 3' are arranged in a manner to be joined at the moment when the brush engages sector (1), and contacts 4, 4' are arranged in a manner to be joined just before the brush leaves sector (1).

These two pairs of contacts are connected in the following manner: (3) is connected to (2) and (3') is connected to one of the peaks of a rectifier bridge the opposite peak of which is connected at the common point between $-E$ and $+E$; 4 and 4' are connected, respectively, to the other two peaks of the bridge. These two last-mentioned peaks are connected by means of a condenser C3, and are connected, respectively, one to the positive terminal of a direct current source, the other terminal of which is grounded, the other peak to the grid of a three-electrode vacuum tube.

This unit constitutes a known device to measure the integral index as was described by Messrs. Bayard and Roquet in their Italian Patent No. 424,527 and to which a rectifier bridge has been joined so that the current impulses picked up in the plate circuit of the tube are made proportional to the absolute value of the successive integral indices.

The operation of this device is as follows:
Let $$\frac{\sqrt{h}-1}{k}$$

be the potential difference at terminals of C2, before the passage of brush upon (2), $\sqrt{h}$ this difference immediately afterwards, $$\frac{\sqrt{h}}{k}$$

this difference after the passage of the brush over 3, 3'. We have:

$$\pm C_1 E + C_2 \frac{\sqrt{h}-1}{k} = (C_1+C_2)\sqrt{h}$$

and $$C_2\sqrt{h} = (C_2+C_3)\frac{\sqrt{h}}{k}$$

whence:

$$k = \frac{C_2+C_3}{C_2}$$

and therefore:

$$\pm C_1 E + \frac{C_2^2}{C_2+C_3}\sqrt{h-1} = (C_1+C_2)\sqrt{h}$$

Assuming:

$$ih = \frac{(C_1+C_2)\sqrt{h}}{C_1 E}$$

We have:

$$ih = \pm 1 + \frac{C_2^2}{(C_2+C_3)(C_2+C_1)} ih - 1$$

The $i_h$ represents therefore the basic index numbers:

$$m = \frac{(C_2+C_3)(C_2+C_1)}{C_2}$$

As we have the voltage $$\frac{|\sqrt{h}|}{k}$$

in the grid of the tube during the largest part of the elementary interval, the plate current of the tube depends therefore on $$|ih|$$

and it may be made proportional to it. Thus it is possible to record the integral index in absolute value whence it is possible to deduce those of the restricted indices.

We assume, in order to fix the ideas, that it is desired to record the absolute values of the restricted indices of order 3, that is the different combinations of signals formed by a received signal and the three signals which precede it.

These combinations are, excepting the signal, eight in number, namely:

$$+ - - -$$
$$+ - - +$$
$$+ - + -$$
$$+ - + +$$
$$+ + - -$$
$$+ + - +$$
$$+ + + -$$
$$+ + + +$$

Let us suppose, furthermore, that we select to record the base indices $m=3$ which may be done by selecting $C_2=C_3=2C_1$.

To the eight preceding combinations then correspond the following values of the restricted indices:

$$1 - \frac{1}{3} - \frac{1}{9} - \frac{1}{27} = \frac{14}{27} = 0.5185$$

$$1 - \frac{1}{3} - \frac{1}{9} + \frac{1}{27} = \frac{16}{27} = 0.5925$$

$$1 - \frac{1}{3} + \frac{1}{9} - \frac{1}{27} = \frac{20}{27} = 0.7407$$

$$1 - \frac{1}{3} + \frac{1}{9} + \frac{1}{27} = \frac{22}{27} = 0.8148$$

$$1 + \frac{1}{3} - \frac{1}{9} - \frac{1}{27} = \frac{32}{27} = 1.1852$$

$$1 + \frac{1}{3} - \frac{1}{9} + \frac{1}{27} = \frac{34}{27} = 1.2592$$

$$1 + \frac{1}{3} + \frac{1}{9} - \frac{1}{27} = \frac{38}{27} = 1.4074$$

$$1 + \frac{1}{3} + \frac{1}{9} + \frac{1}{27} = \frac{40}{27} = 1.4815$$

In order to cause the release of a given device when the recorded index assumes one of these values, the mounting which has just been described is completed in the following manner:

Seven telegraphic relays $R_1, R_2 \ldots R_7$ have their coils connected in series in the plate circuit of the tube in Fig. 2; each of the armatures $a_1, a_2 \ldots a_7$ of these relays is connected to the armature of the following relay by a resistance $P_2, P_3 \ldots P_7$; the armature $a_1$ of $R_1$ is further connected by a resistance to a direct current source the other pole of which is grounded, and the armature $a_7$ of $R_7$ is connected to ground by means of a resistance $P_8$.

On the other hand, each working contact of a relay is connected to the rest contact of the following relays by means of an indicator device of any suitable type, each of these devices, when excited, showing a given value of the restricted index number. The first device $O_1$ is connected between the ground and the rest contact $r_1$ of relay $R_1$, the second device $O_2$ is connected between working contact $t_1$ of relay $R_1$ and the rest contact $r_2$ of $R_2$, and so forth, the last device $O_8$ being connected between the working contact $t_7$ of relay $R_7$ and the ground.

In the example considered, for measuring restricted indices of order 3 and base 3, relays $R_1, R_2 \ldots R_7$ are arranged in such a manner that their armatures engage the rest contact, or on the other hand the working contact according to the plate current which passes through their coils corresponding, respectively, for the different relays, to an integral index:

|  | Less than— | More than— |
|---|---|---|
| $R_7$ | 1.426 | 1.463 |
| $R_6$ | 1.278 | 1.389 |
| $R_5$ | 1.204 | 1.241 |
| $R_4$ | 0.833 | 1.167 |
| $R_3$ | 0.759 | 0.796 |
| $R_2$ | 0.611 | 0.722 |
| $R_1$ | 0.537 | 0.574 |

Under these conditions, a recording device occupying a determined rank $n$ in the chain of said devices, is excited when the relays $R_1, R_2 \ldots R_{n-1}$ are operating, and the following relays are at rest. For instance, the device $O_4$ which, by its release, should mark the index corresponding to the fourth combination of the table given above, that is to say 0.8148, will be excited when relays $R_1$ to $R_3$ are operating and relays $R_4$ to $R_7$ are at rest.

The operation of these indicator devices which may be, for instance, relays, may thereupon be exploited in any form within the scope of the invention, they may, for instance, act upon an electrical circuit in a manner to impart to the current traversing it an intensity proportional to the value of the corresponding restricted index; they can also serve to control the precorrection circuits.

Although certain specific embodiments have been disclosed herein for purposes of illustration, it will be evident to those skilled in the art that the invention is capable of various modifications and adaptations within the scope of the appended claim.

The invention claimed is:

In a device for absolute value measurement of the restricted index number of a telegraphic modulation, a source of signals, a recording relay having a coil connected to said source and having contacts connected, respectively, to two direct current sources of different polarities, a rotary distributor making one revolution during the duration of a signal and having a long conductor sector connected to the armature of said recording relay, a brush connected by means of a first condenser to the common point between said two current sources, a short conductor sector on said distributor connected by means of a second condenser to said common point, a pair of contacts on said distributor arranged to be short-circuited at the moment when said brush engages said long sector, one of the contacts of said pair being connected to said short sector and the other to one of the peaks of a rectifier bridge the opposite peak of which is connected to the common point between said two current sources, a second pair of contacts on said distributor arranged to be short-circuited just before said brush leaves said long sector and being connected, respectively, to the two other peaks of the bridge, a third condenser connecting the last-mentioned two peaks of said bridge, another current source having one of its terminals connected to one of said two last-mentioned peaks and having its other terminal grounded, a three-element vacuum tube having its grid connected to the other of the last two mentioned peaks of said bridge, a chain of relays having their windings connected in series in the plate circuit of said tube, the number of relays in said chain being one less than the number of the different restricted indices susceptible of being recorded in absolute value, a closed circuit comprising a current source and a chain of resistances arranged in series, equal in number to that of the different indices susceptible of being registered in absolute value, the armature of each relay of the above mentioned chain of relays being connected to the armature of the following relay of the chain by means of one of said resistances and the two end resistances of the chain being connected, respectively, to one of the two poles of the current source of said closed circuit, a chain of indicator devices equal in number to that of the restricted indices susceptible of being recorded in absolute value, the first device being connected between a pole of the source and the rest contact of the first relay of said chain, each of the following devices being connected between the working contact of one relay and the rest contact of the following relay, and the last device being connected between the working contact of the last relay and said pole of said source.

JOSEPH PERNIC.
ROBERT LEROY.

No references cited.